Oct. 30, 1956  P. W. FRANKLIN  2,769,133
REGULATING SYSTEM FOR GENERATORS
Filed Jan. 2, 1951  4 Sheets-Sheet 1

INVENTOR.
PAUL W. FRANKLIN
BY
ATTORNEY

Oct. 30, 1956  P. W. FRANKLIN  2,769,133
REGULATING SYSTEM FOR GENERATORS
Filed Jan. 2, 1951  4 Sheets-Sheet 2

INVENTOR.
PAUL W. FRANKLIN
BY James M. Nickels
ATTORNEY

Oct. 30, 1956  P. W. FRANKLIN  2,769,133
REGULATING SYSTEM FOR GENERATORS
Filed Jan. 2, 1951  4 Sheets-Sheet 4

INVENTOR.
PAUL W. FRANKLIN
BY
James M. Nickels
ATTORNEY.

United States Patent Office 2,769,133
Patented Oct. 30, 1956

2,769,133

REGULATING SYSTEM FOR GENERATORS

Paul W. Franklin, Nutley, N. J., assignor to Bendix Aviation Corporation, Teterboro, N. J., a corporation of Delaware Application January 2, 1951, Serial No. 203,986

1 Claim. (Cl. 322—25)

The present invention relates to an excitation system for dynamoelectric machines and more particularly to a self-excitation and regulating system for generators.

In some applications, such as in airplanes, it is desirable to eliminate as many moving parts as possible thereby reducing maintenance and inspection. Static excitation and regulating means are therefor desirable in that they are characterized by quietness of operation, long life and require very little maintenance and is well adaptable for operation at high altitudes and temperatures. Also, the excitation and control means can be located remote from the machine.

According to the present invention, a transductor and rectifier are connected in shunt with a current transformer and rectifier to supply excitation to and to automatically adjust the field current. A sensing device such as a carbon pile regulator controls the transductor in accordance with an output condition of the machine.

An object of the invention is to provide an improved regulating system.

Another object of the invention is to provide improved means for excitation and regulation of a dynamoelectric machine.

Another object of the invention is to provide compound excitation for a dynamoelectric machine.

Another object of the invention is to provide an improved static exciter for a dynamoelectric machine.

Another object of the invention is to provide improved means for the excitation of dynamoelectric machines by means of transductors and rectifiers.

The above and other objects and features of the invention will appear more fully hereinafter from a consideration of the following description taken in connection with the accompanying drawing wherein three embodiments are illustrated by way of example. It is to be understood, however, that the drawings are for the purpose of illustration only and are not designed as a definition of the limits of the invention.

Figure 1:
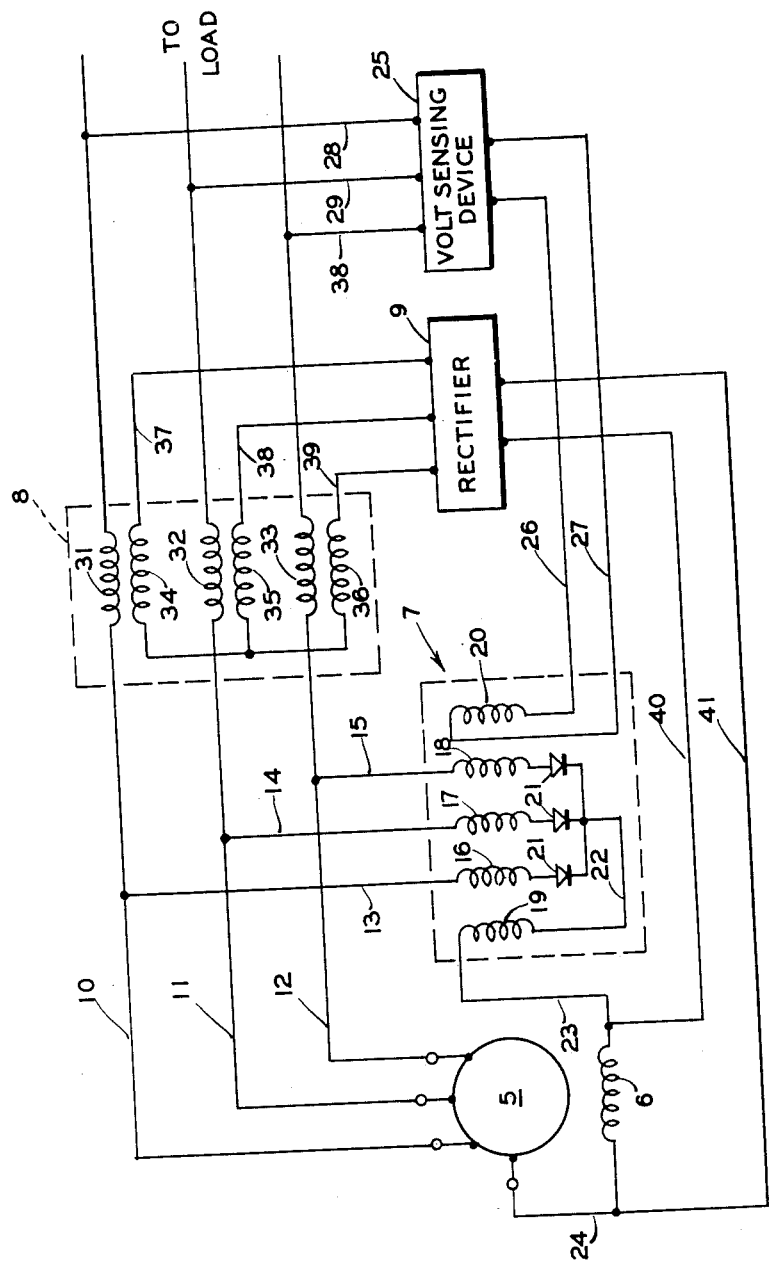
Figure 1 is a simplified schematic diagram illustrating the principle of the invention.

Referring now to Figure 1, wherein there is illustrated diagrammatically a generator 5 having a field winding 6. Excitation for the field winding 6 is obtained from the output of the generator 5 by means of a transductor 7 and current transformer 8 in series with a rectifier 9.

A transductor is a combination of stationary magnetic circuits, including at least one alternating current coil and at least one direct current coil, and one or several rectifiers. The rectifier serves as a valve or for rectifying means or both. The transductor is energized from an A. C. source and may supply a load with either A. C. or D. C. current that is variable over wide limits by changes in a low powered D. C. control circuit.

The transductor 7 is connected to output lines 10, 11 and 12 by conductors 13, 14 and 15 and comprises A. C. windings 16, 17 and 18, and D. C. windings 19 and 20. The transductor 7 may be of conventional transformer design or it may use a toroidal core. Two or more cores of either special high permeability or standard commercial grade steel may be used. One end of the windings 16, 17 and 18 is connected to the respective conductors 13, 14 and 15. The other end of the windings 16, 17 and 18 is connected through rectifiers 21 and conductor 22 to one end of the winding 19. The other end of the winding 19 is connected to one end of the winding 6 by a conductor 23. The other end of the winding 6 is connected by a conductor 24 to the neutral of the generator 5. The control winding 20 is fed from a voltage sensing device 25 by conductors 26 and 27. The voltage sensing device may be one of the conventional types well known in the art such as a carbon pile regulator, electronic, static or others. The sensing device 25 is connected to the output lines 10, 11 and 12 by conductors 28, 29 and 30 to sense output voltage.

To obtain a series component of excitation for the field winding 6, primary windings 31, 32 and 33 of the current transformer 8 are connected in series with the output conductors 10, 11 and 12. Secondary windings 34, 35 and 36 of the transformer 18 are connected across the input of rectifier 9 by conductors 37, 38 and 39. It is understood, however, that the secondaries could be delta connected. The output of the rectifier 9 is connected by conductors 40 and 41 across the field winding 6. While the winding 6 is shown as one winding, it is understood that it could be two separate windings with one component of excitation on one, and the other component on the other winding.

In operation, the shunt component of excitation is obtained from the output of the generator 5 through the transductor 7. The transductor 7 is controlled by the voltage sensing device 25 in response to an output condition of the generator 5.

The series component of excitation is obtained from the current transformer 8 in series with the rectifier 9 and varies with the load condition of the generator 5.

While a half wave transductor has been illustrated it is understood that a full wave or bridge type of transductor could also be used. Also the windings 16, 17 and 18 may be connected to the load circuit after the current transformer as well as before as illustrated.

Figure 2:
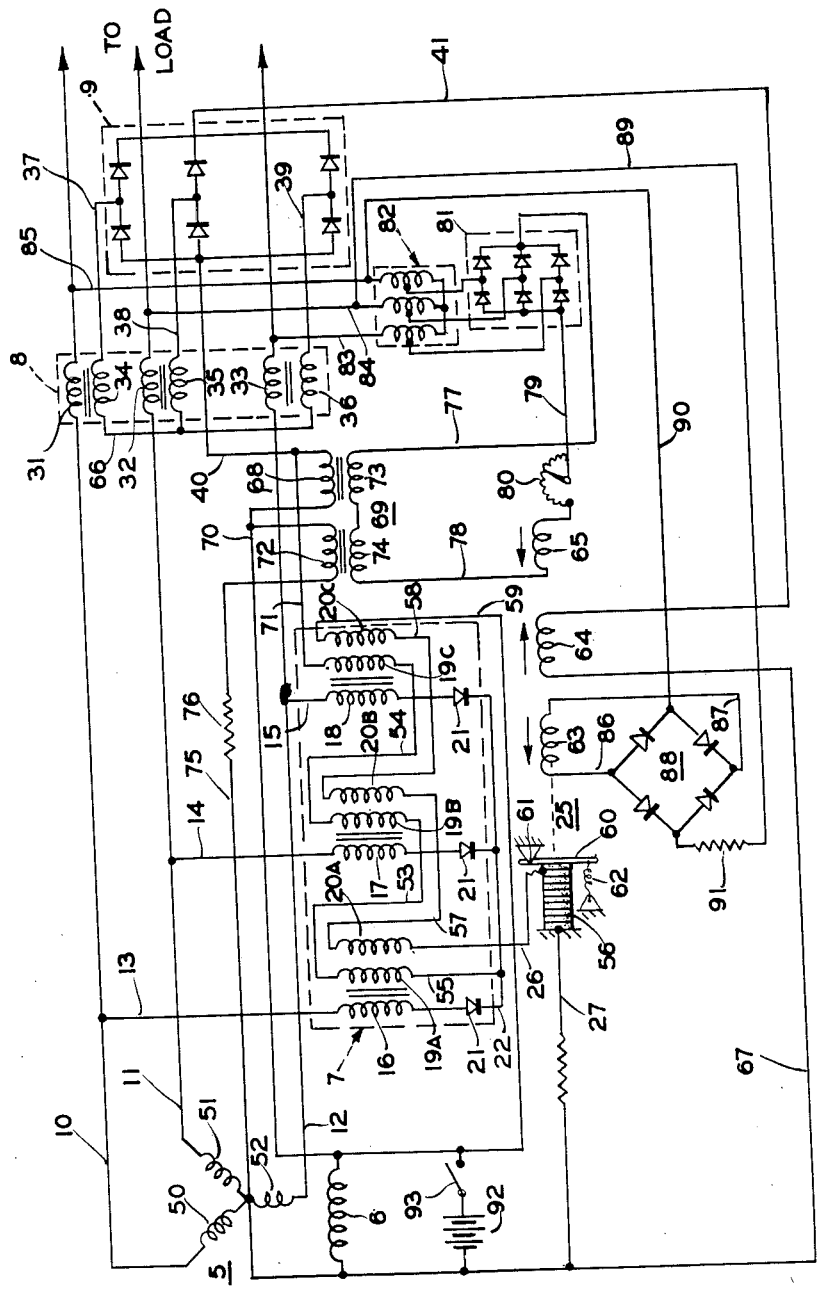
Figure 2 is a schematic diagram illustrating one embodiment of the invention.

Referring now to Figure 2 for a system embodying the invention, a generator 5 is illustrated as having a field winding 6 and three phase armature windings 50, 51 and 52. It is understood, however, that the three phase windings could be stationary and the field rotating. The generator 5 is adapted to be driven from any suitable source such as the engine of an airplane (not shown). The windings 50, 51 and 52 are connected to output lines 10, 11 and 12 respectively.

Excitation for the winding 6 is obtained from the output of the generator 5 through the transductor 7 and current transformer 8. The aforenoted arrangement, as will be explained later, provides a compound excitation for the field winding 6. While winding 6 has been illustrated as a single winding, separate windings could be used for the different components of excitation.

The transductor 7 is illustrated as having three winding sections and may be of conventional transformer design or they may use a toroidal core. The windings may be on two or more cores. One end of the A. C. windings 16, 17 and 18 of the transductor 7 are connected by conductors 13, 14 and 15 to the respective output conductors 10, 11 and 12. The other end of the windings 16, 17 and 18 are connected through rectifiers 21 to a conductor 22. Feedback windings 19A, 19B and 19C are connected in series by conductors 53 and 54. The outer end of the winding 19A is connected by a conductor 55 to the conductor 22. Control windings 20A, 20B and 20C are connected in series with a carbon pile resistance element 56, of a regulator indicated generally by the numeral 25, by conductors 26, 27, 57, 58 and 59 across the field 6.

From the foregoing description it can be seen that a three phase half wave connection is being illustrated. It is understood, however, that a three phase full wave, or single phase full or half wave connection could be used.

The carbon pile element 56 is included in the circuit with the control windings 20A, 20B and 20C so as to vary the D. C. excitation of the transductor 7 in accordance with a condition of the field 6. The regulator 25 may be of a type described and claimed in U. S. Patent No. 2,427,805, granted to William G. Neild. The regulator 25 is illustrated diagrammatically herein as including an armature 60 pivoted at 61 and biased by a spring 62 in a direction for decreasing the resistance of the carbon pile element 56. Opposing the spring 62 are electromagnetic control winding 63, 64 and 65. While a carbon pile regulator has been illustrated, it is understood that other voltage sensing devices may be used.

The current transformer 8 has primary windings 31, 32 and 33 and secondary windings 34, 35 and 36. The primary windings 31, 32 and 33 are inserted in the respective conductors 10, 11 and 12 and are in series circuit relationship therewith. One end of the respective secondary windings 34, 35 and 36 are connected together by a conductor 66. The other end of the windings are connected to the input of the respective phases of a three phase rectifier 9 by conductors 37, 38 and 39.

One output terminal of the rectifier 9 is connected by a conductor 41 to one end of the winding 64. The other end of the winding 64 is connected by a conductor 67 to one end of the field winding 6 and to the neutral point of the windings 50, 51 and 52. The other output terminal of the rectifier 9 is connected by a conductor 40 to one side of a primary winding 68 of a transformer 69. The other side of the winding 68 is connected by a conductor 70 to the other end of field winding 6. The outer end of the winding 19C of the transductor 7 is connected by a conductor 71 to the conductor 40.

In addition to the winding 68, the transformer 69 has a primary winding 72 and secondary windings 73 and 74. One end of the winding 72 is connected to the conductor 70 and the other end is connected by a conductor 75 to the neutral point of the windings 50, 51 and 52. A resistor 76 may be inserted in the conductor 75 to limit the voltage across the winding 72. The windings 73 and 74 are connected in series by conductors 77, 78 and 79 with the winding 65 and rheostat 80 across the output terminals of a three phase rectifier 81. The three input terminals of the rectifier 81 are connected to the output lines 10, 11 and 12 through a transformer 82 and conductors 83, 84 and 85.

The winding 63 is connected by conductors 86 and 87 across the output terminals of a rectifier 88. One input terminal is connected by a conductor 89 to the conductor 84 and the other input terminal is connected by a conductor 90 to the conductor 85. A resistor 91 may be inserted in the conductor 89 to limit the voltage across the input of the rectifier 88.

It may be necessary to supply the initial excitation for a short instant from an external source such as a battery 92 connected across the field 6 through a switch 93. It is understood, however, that other means may be used for supplying the initial excitation, such as the inherent remanent magnetism in the generator.

In operation, the shunt excitation is obtained from the output lines through the transductor 7. The coils 16, 17 and 18 of the transductor 7 receive A. C. excitation from the output lines 10, 11 and 12. The A. C. passing through the coils 16, 17 and 18 is rectified and supplies the D. C. energization to the feedback coils 19A, 19B and 19C. The coils 19A, 19B and 19C are connected in series to obtain a suitable sensitivity thereof. The windings 20A, 20B and 20C are connected in series with the carbon pile element 56 across the field 6 and provide a D. C. control voltage for the transductor 7 in accordance with a condition of the field 6. The carbon pile 56 is in turn controlled by output voltage and current of the generator 5. The D. C. output of the transductor 7 is connected in series with the field 6.

The series excitation is obtained from the current transformer 8 and is rectified and the rectified output connected across the field 6 and compounded with the shunt excitation from the reactors.

The transformer 69 has one of its primaries connected in series with the field and the other connected across the field thus providing one winding sensitive to voltage and the other to current. Upon transient changes in either voltage or current or both, a voltage is induced in the secondaries to aid the control winding to oppose the transient changes.

Figure 3:
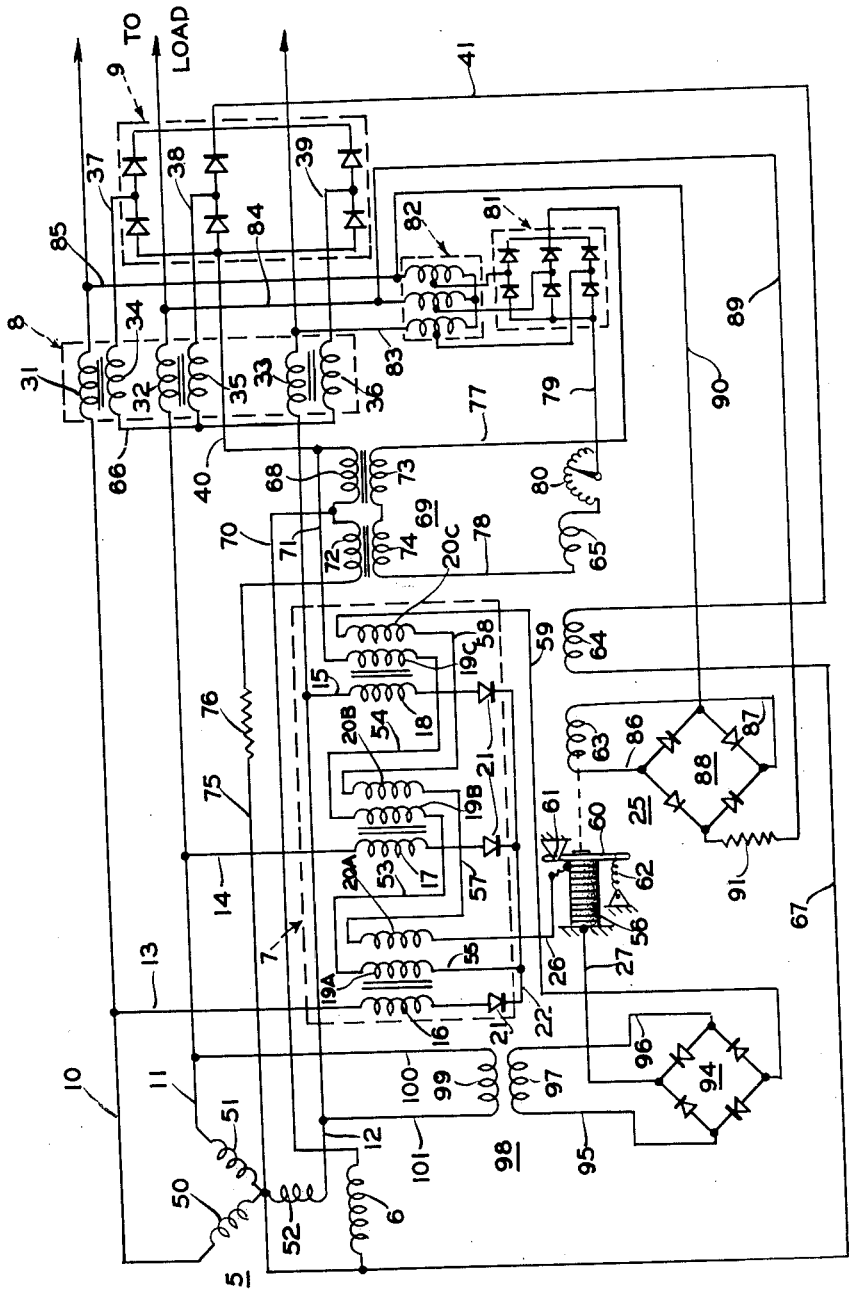
Figure 3 is a schematic diagram illustrating a modification of Figure 1.

Referring now to Figure 3 wherein like parts are assigned the same reference numerals as in Figures 1 and 2. Only that portion of the circuit differing from Figure 2 will be described in detail as the remainder is a duplication of the circuit of Figure 2.

The control windings 20A, 20B and 20C of the transductor 7 are connected in series with the carbon pile element 56 by conductors 26, 27, 57, 58 and 59 across output terminals of a rectifier 94. Input terminals of the rectifier 94 are connected by conductors 95 and 96 to secondary winding 97 of a transformer 98. The secondary winding 97 is energized by primary winding 99 of the transformer 98. One end of the winding 99 is connected by a conductor 100 to the output line 11 and the other end of the winding 99 is connected by a conductor 101 to the output line 12.

In operation, the control windings 20A, 20B and 20C are energized by the voltage across the output lines 11 and 12 instead of across the field 6 as in Figure 2. Otherwise, the operation is similar to that of Figure 2.

Figure 4:
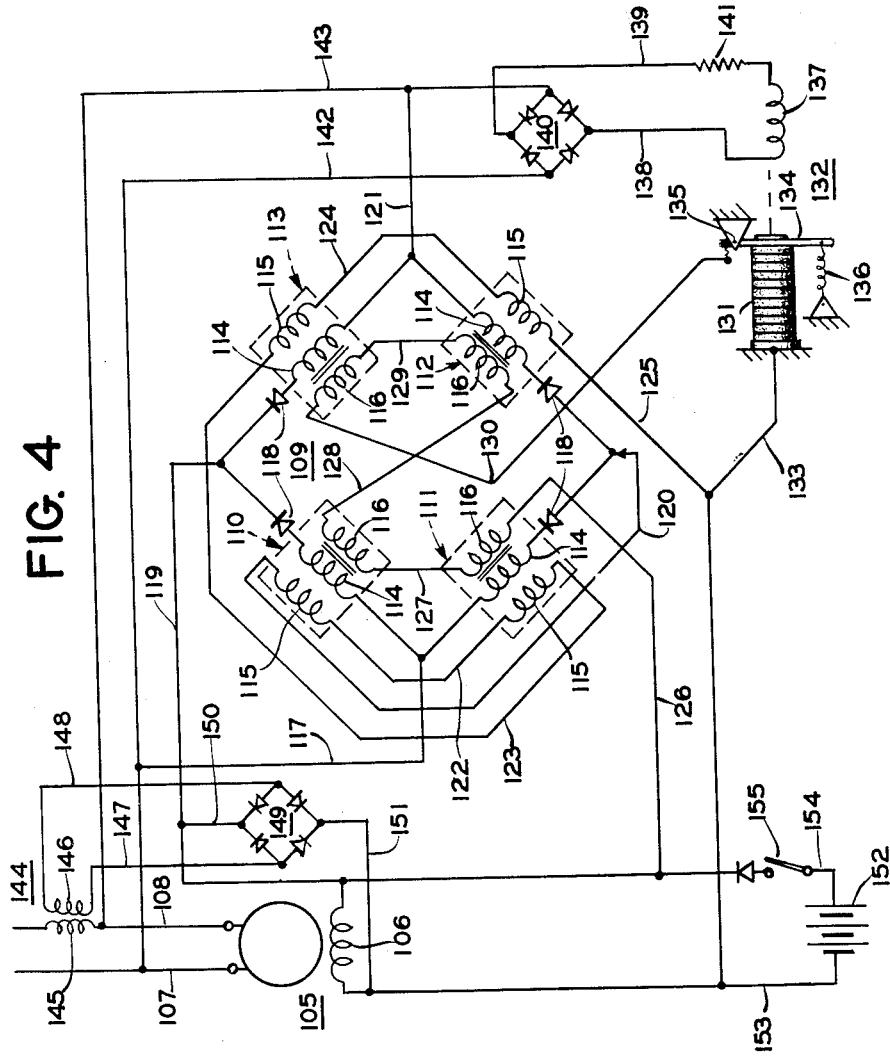
Figure 4 is a schematic diagram of a single phase system embodying the invention.

Figure 4 illustrates an embodiment of the invention as applied to a single phase generator and using full wave rectification. A single phase generator is indicated generally by the numeral 105 and has a field winding 106. Output lines 107 and 108 are adapted to be connected to a suitable load (not shown).

Shunt excitation for the winding 106 is obtained by means of a transductor indicated generally by the numeral 109. The transductor 109 may be of conventional transformer design or it may use a toroidal core. Either two or more cores or a combination punching may be used. The transductor 109 is illustrated as having four winding sections 110, 111, 112, and 113. It is understood however, that other arrangements of windings could be used. Each section comprises an alternating current winding 114 and D. C. windings 115 and 116. One end of the winding 114 of the section 110 is connected by a conductor 117 to the output line 107. The other end of the winding 114 of section 110 is connected through rectifier 118, conductor 119 to one end of the field winding 106. One end of the winding 114 of section 111 is connected to the conductor 117. The other end of the winding 114 of section 111 is connected through rectifier 118 to a conductor 120. Also, one end of the winding 114 of section 112 is connected through a rectifier 118 to the conductor 120.

The other end of the winding 114 of section 112 is connected by a conductor 121 to the output line 108. One end of the winding 114 of section 113 is also connected to the conductor 121 with the other end connected through rectifier 118 to the conductor 119.

One end of winding 115 of section 110 is connected to the conductor 120 and the other end is connected by a conductor 122 to one end of the winding 115 of section 111. The other end of the winding 115 of section 111 is connected by a conductor 123 to one end of the winding 115 of section 113. The other end of the winding 115 of section 113 is connected by a conductor 124 to one end of the winding 115 of section 112. The other end of the winding 115 of section 112 is connected by a conductor 125 to the other side of the winding 106.

One end of the winding 116 of section 111 is connected by a conductor 126 to one end of the winding 106 the other end of the winding 116 being connected by a conductor 127 to one end of the winding 116 of section 110. The other end of the winding 116 of section 110 is connected by conductor 128 to one end of the winding 116 of section 112. The other end of the winding 116 of section 112 is connected by a conductor 129 to one end of the winding 116 of section 113. The other end of the winding 116 of section 113 is connected by a conductor 130 to one end of a carbon pile element 131 of a regulator indicated generally by the numeral 132. The other end of the element 131 is connected by a conductor 133 to the other side of the winding 106.

The regulator 132 is illustrated diagrammatically as including an armature 134 pivoted at 135 and biased by a spring 136 in a direction for decreasing the resistance of the carbon pile element 131. Opposing the spring 136 is an electromagnetic control winding 137. It is understood, however, that other forms of voltage sensing devices may be used.

The control winding 137 is connected by conductors 138 and 139 across the output of a rectifier 140. A variable resistor 141 may be connected in series with the winding 137 to adjust the voltage across the winding 137. One input terminal of the rectifier 140 is connected by a conductor 142 to the output line 107 and the other input terminal is connected by a conductor 143 to the output line 108. While only one control winding has been illustrated for the regulator 132, it is understood that various arrangements of the control windings may be used.

Series excitation for the generator 105 is obtained through current transformer 144 having a primary winding 145 connected in series in the conductor 108 and a secondary winding 146 connected by conductors 147 and 148 across the input of rectifier 149. One output terminal of the rectifier 149 is connected by conductor 150 to one end of the winding 106 and the other output terminal is connected by a conductor 151 to the other end of the winding 106. While the winding 106 is illustrated as one winding it is understood that the series excitation may be on a separate winding.

Inasmuch as the residual magnetism of the generator 105 may not be sufficient to overcome the resistance of the rectifiers, initial excitation may be supplied for a short instant from an external source shown by way of illustration as a battery 152 connected across the winding 106 by conductors 153, 154 and a switch 155.

The operation is somewhat similar to that of Figure 1. The shunt excitation is obtained from the generator output by means of the transductor 109. The transductor 109 is controlled by the D. C. windings in accordance with a condition of the field winding. The regulator 132 controls the D. C. windings corresponding to an output condition. The series excitation is obtained from a current transformer and is a function of the load.

Figure 5:
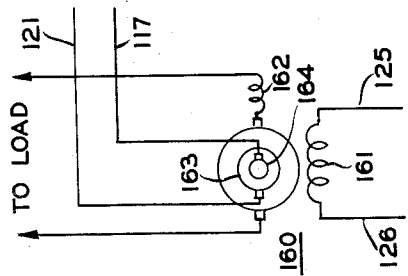
Figure 5 is a modification of the system of Figure 3 for a direct current system.

Referring now to Figure 5 for an illustration of the application of the invention to a D. C. generator. Only that portion different from Figure 4 is illustrated as the remainder of the system is common to both.

A D. C. generator 160 is illustrated as having a shunt field winding 161 and a series field winding 162. A. C. excitation for the transductor 109 is obtained by means of slip rings 163 and 164 and conductors 117 and 121. Otherwise, the shunt excitation is obtained in the same manner as in Figure 4. The series excitation is obtained from the series winding 162.

The different combinations of the A. C. feed-back and control windings may be proportioned so that the resulting magnetic pressure exerted by the control and feed-back windings may be located in the region of either high or low incremental permeability of the saturation curve. This results in two entirely different modes of operation of the transductors, both of which may be used for successful operation of the system.

While the systems have been illustrated using both shunt and series excitation, either could be used alone where the application of the combination would not be required. The combination has the advantages in that the range of shunt currents are reduced making the regulation inherently easier and permitting the use of smaller shunt components.

A further advantage is that the smaller time constant permits rapid follow up of excitation thus lessening the effects of sudden load shocks. Also, in case of a short circuit, the current will not build up to excessive values as the shunt excitation will drop as the current tends to rise.

The excitation and regulating components are adapted for mounting remote from the generator thus simplifying installation.

Although several embodiments of the invention have been illustrated and described, various changes in the form and relative arrangement of the parts, which will now appear to those skilled in the art, may be made without departing from the scope of the invention.

What is claimed is:

A regulating system for a self-excited generator having a field winding and an output circuit comprising a saturable inductance having a plurality of alternating current windings, a plurality of feed back windings and a plurality of control windings, means for energizing said alternating current windings from said output circuit, means including rectifiers for energizing said feed back windings from said alternating current windings, means for impressing the output from said feed back windings upon said field winding, means for energizing said control windings in accordance with the output of said generator, and means including a variable resistance element for varying said control winding to effect said alternating current and feed back windings in accordance with variations in said output, a current transformer in series with said output circuit and means including a rectifier for impressing the output of said current transformer upon said field winding.

References Cited in the file of this patent
UNITED STATES PATENTS

| 2,455,869 | Krabbe | Dec. 7, 1948 |
| 2,477,988 | Krabbe | Aug. 2, 1949 |
| 2,519,650 | Hamilton | Aug. 22, 1950 |

FOREIGN PATENTS

| 632,056 | Great Britain | Nov. 15, 1949 |

OTHER REFERENCES

"Magnetic Amplifiers of the Balance Detector Type," by W. A. Geyger, A. I. E. E. Miscellaneous Paper 50–93, December 1949.